(12) United States Patent
Yamada (10) Patent No.: US 6,172,737 B1
(45) Date of Patent: Jan. 9, 2001

(54) IMAGE RECORDING APPARATUS (75) Inventor: Naoto Yamada, Kanagawa (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 09/220,339

(22) Filed: Dec. 24, 1998

(30) Foreign Application Priority Data

Dec. 25, 1997 (JP) .................................................. 9-357140

(51) Int. Cl.$^7$ ........................... G03B 29/00; G03B 15/00; G03B 17/22
(52) U.S. Cl. ............................... 355/29; 355/28; 399/385; 396/445
(58) Field of Search ........................ 355/28, 29; 399/385; 396/445

(56) References Cited

U.S. PATENT DOCUMENTS

| | | | |
|---|---|---|---|
| 4,314,757 | * | 2/1982 | Anderson et al. ...................... 355/29 |
| 4,984,029 | * | 1/1991 | Nishikawa ............................ 355/310 |
| 5,187,531 | * | 2/1993 | Ozawa et al. ......................... 355/308 |
| 5,257,065 | * | 10/1993 | Nagel ................................... 355/28 |
| 5,307,114 | * | 4/1994 | Nitsch et al. .......................... 355/29 |
| 5,362,008 | * | 11/1994 | Nagel et al. .......................... 242/417 |
| 5,420,699 | * | 5/1995 | Yamanouchi et al. ............... 358/487 |

* cited by examiner

Primary Examiner—Russell Adams
Assistant Examiner—Khaled Brown
(74) Attorney, Agent, or Firm—Sughrue, Mion, Zinn, Macpeak & Seas, PLLC (57) ABSTRACT There is provided an image recording apparatus comprising a pull-out roller pair to pull a light-sensitive material out of a light-sensitive material magazine accommodating a light-room-loading-type light-sensitive material having an extreme end leader portion at its leading end, a cutter to cut the pulled out light-sensitive material, a sensor to detect the extreme end leader portion or the light-sensitive material, and a control computer to control the pull-out roller pair and the cutter in accordance with a detecting signal from the sensor. The extreme end leader portion and the light-sensitive material are transported in accordance with detecting signal and then the extreme end leader portion is automatically cut along a boundary with the light-sensitive material. Thus, the wastes of the light-sensitive material is prevented.

15 Claims, 6 Drawing Sheets

IMAGE RECORDING APPARATUS

BACKGROUND OF THE INVENTION

The present invention relates to the technical field of an image recording apparatus into which light-sensitive material magazines each accommodating a light-sensitive material roll of lighted room loading type are loaded, said light-sensitive material roll including an elongated light-sensitive material wound to a roll shape and an extreme end leader portion composed of a non-light-sensitive material and connected to a leading end of the light-sensitive material.

Most of the images recorded on photographic films such as negatives and reversals (which are hereinafter simply referred to as "films") are conventionally printed onto light-sensitive materials by a technique generally called "direct exposure" (analog exposure) in which an image on a film is projected onto a light-sensitive material for a real exposure.

On the other hand, an image recording apparatus that adopts digital exposure has recently been used. In this "image recording apparatus", an image recorded on a film is read photoelectrically and converted into digital signals, which are subjected to various kinds of image processing to produce image data for recording; a light-sensitive material is exposed by scanning with recording light modulated in accordance with the image data, thereby recording a (latent) image. Further, a digital photoprinter into which the image recording apparatus is incorporated and in which the recorded image by the image recording apparatus is subjected to developing processing and outputted a print image as a finished print (photograph) has been commercialized.

The image recording apparatus uses various types of light-sensitive materials such as a silver halide light-sensitive material, a thermally developable light-sensitive material, a light- and heat-sensitive recording material and the like.

Many of the light-sensitive materials are supplied to the image recording apparatus in the state of the light-sensitive material roll wound a web of the elongated light sensitive material and cut to a size corresponding to the size of a hard copy such as the finished print which is to be created in the image recording apparatus, although some materials are previously cut to sheets having a specified length before being supplied to the image recording apparatus. Further, a specified magazine accommodating the light-sensitive material roll is loaded in a specified position of the image recording apparatus in many cases.

For example, a specified magazine accommodating a light-sensitive material roll is loaded in a specified position of the image recording apparatus. The light-sensitive material pulled out of the magazine is cut to sheets of a specified length corresponding to a print size, and the thus cut sheets are transported on a specified passage, that is, a specified transport path and subjected to various processing steps such as exposure, development and drying thereby providing (finished) prints. Alternatively, the light-sensitive material is transported on a specified passage in an elongated state and subjected to the various processing steps such as exposure, development and drying before the material is finally cut to the prints.

The light-sensitive materials include also a lighted room loading type light-sensitive material called a QL paper. This is a material including an elongated light-sensitive material roll and an extreme end leader portion, the latter being composed of a non-light-sensitive material, connected to a leading end of the former and wound around the roll twice so that the roll can be loaded into a magazine even in a lighted room.

In a conventional lighted room loading type light-sensitive material roll, a user inserted the light-sensitive material roll into a magazine, pulled the extreme end leader portion out of the magazine and cut it out of the light-sensitive material before he loaded the magazine into an image recording apparatus.

In the conventional method however, the user cannot cut straight the extreme end leader portion perpendicularly to a longitudinal direction, that is, a direction in which the light-sensitive material is transported. Thus, the cut portion may be oblique or the light-sensitive material may be exposed to light in the vicinity of the cut portion. If the cut portion is oblique, the light-sensitive material cannot be inserted into transporting rollers straight and the passing-through property of the leading end of the light-sensitive material is deteriorated, whereupon jamming or other inconveniences may occur.

To cope with the above problem, after the user cuts the extreme end leader portion and loads the magazine into the image recording apparatus, the portion of the light-sensitive material initially pulled out of the magazine is cut to a strip shape in a specified length perpendicularly to the direction in which the light-sensitive material is transported. As a result, there arises however a problem that the light-sensitive material is wasted.

SUMMARY OF THE INVENTION

An object of the present invention made in view of the above conventional problems is to provide an image recording apparatus capable of preventing the waste of a light-sensitive material by automatically cutting the extreme end leader portion.

To attain the above object, the present invention provides an image recording apparatus comprising:

at least one loading section each of which loads a light-sensitive material magazine accommodating a light-sensitive material roll of a lighted room loading type, said light-sensitive material roll including an elongated light-sensitive material wound to a roll shape and an extreme end leader portion composed of a non-light-sensitive material and connected to a leading end of the light-sensitive material;

at least one pull-out roller pair each of which pulls the light-sensitive material out of said light-sensitive material magazine;

at least one cutting means each of which cuts the light-sensitive material which was pulled out by said pull-out roller pairs;

at least one sensor each of which detects said extreme end leader portion or the light-sensitive material;

means for controlling said pull-out roller pair and said cutting means in accordance with a detecting signal from the sensor so that said extreme end leader portion is automatically cut along a boundary with said light-sensitive material while transporting said extreme end leader portion and the light-sensitive material by said pull-out roller pair when the light-sensitive material magazine accommodating a virgin light-sensitive material roll is loaded; and an image recording section to record a latent image on the light-sensitive material.

Preferably, the image recording apparatus further comprises a processor having a developing section to develop the light-sensitive material on which the latent image was recorded.

Preferably, said sensor detects a forward end of said extreme end leader portion.

Preferably, said sensor is a contact type sensor having a movable arm to detect that said arm came into contact with said forward end of said extreme end leader portion, or an optical sensor to detect that said forward end of said extreme end leader portion passed through a light beam emitted by the optical sensor.

Preferably, said cutting means cuts said extreme end leader portion which is transported by the pull-out roller pair by a specified distance after said forward end was detected by the sensor.

Preferably, said cutting means cuts said extreme end leader portion to strips at specified intervals until said extreme end leader portion is transported by a specified distance by the pull-out roller pair after said forward end was detected by the sensor.

Preferably, said sensor detects the boundary between said extreme end leader portion and the light-sensitive material by optical or mechanical recognition.

Preferably, said sensor is a contact type sensor having the movable arm to detect the boundary formed by a tape connecting said extreme end leader portion and the light-sensitive material based on a step between the extreme end leader portion and the tape when said movable arm came into contact with said boundary, or an optical sensor which emits the light beam on back surfaces of the extreme end leader portion and the light-sensitive material to detect the boundary therebetween based on a difference in reflectances of the back surfaces.

Preferably, said cutting means cuts said extreme end leader portion which is transported by a specified distance by the pull-out roller pair after said boundary was detected by the sensor.

Preferably, said cutting means cuts said extreme end leader portion to strips at specified intervals until said extreme end leader portion is transported by a specified distance by the pull-out roller pair after said boundary was detected by the sensor.

Preferably, the image recording apparatus further comprises means for eliminating the extreme end leader portion which was cut by said cutting means in a transport path through which the light-sensitive material is transported.

Preferably, said eliminating means comprises a flapper which is provided in the transport path through which said light-sensitive material is transported and which changes a transport direction for the cut extreme end leader portion, and a stacker provided under the flapper to receive the cut extreme end leader portion.

Preferably, the image recording apparatus further comprises means for eliminating the extreme end leader portion which was cut by said cutting means after having transported through an ordinary transport path including the developing section of the processor through which the light-sensitive material is transported.

Preferably, said eliminating means comprises a flapper which is provided in said ordinary transport path through which said light-sensitive material is transported and downstream of the developing section in the processor, and which changes a transport direction for the cut extreme end leader portion, and a stacker provided under the flapper to receive the cut extreme end leader portion.

Preferably, said processor further comprises a sorter having a plurality of sorting sections for sorting finished prints, and wherein said extreme end leader portion which was cut by said cutting means is transported through an ordinary transport path through which the light-sensitive material is transported and is received into one section of said sorter.

DETAILED DESCRIPTION OF THE INVENTION

The image recording apparatus of the present invention will be described in detail with reference to preferred embodiments shown in the accompanying drawings.

First, a first embodiment of the present invention will be described.

Figure 1:
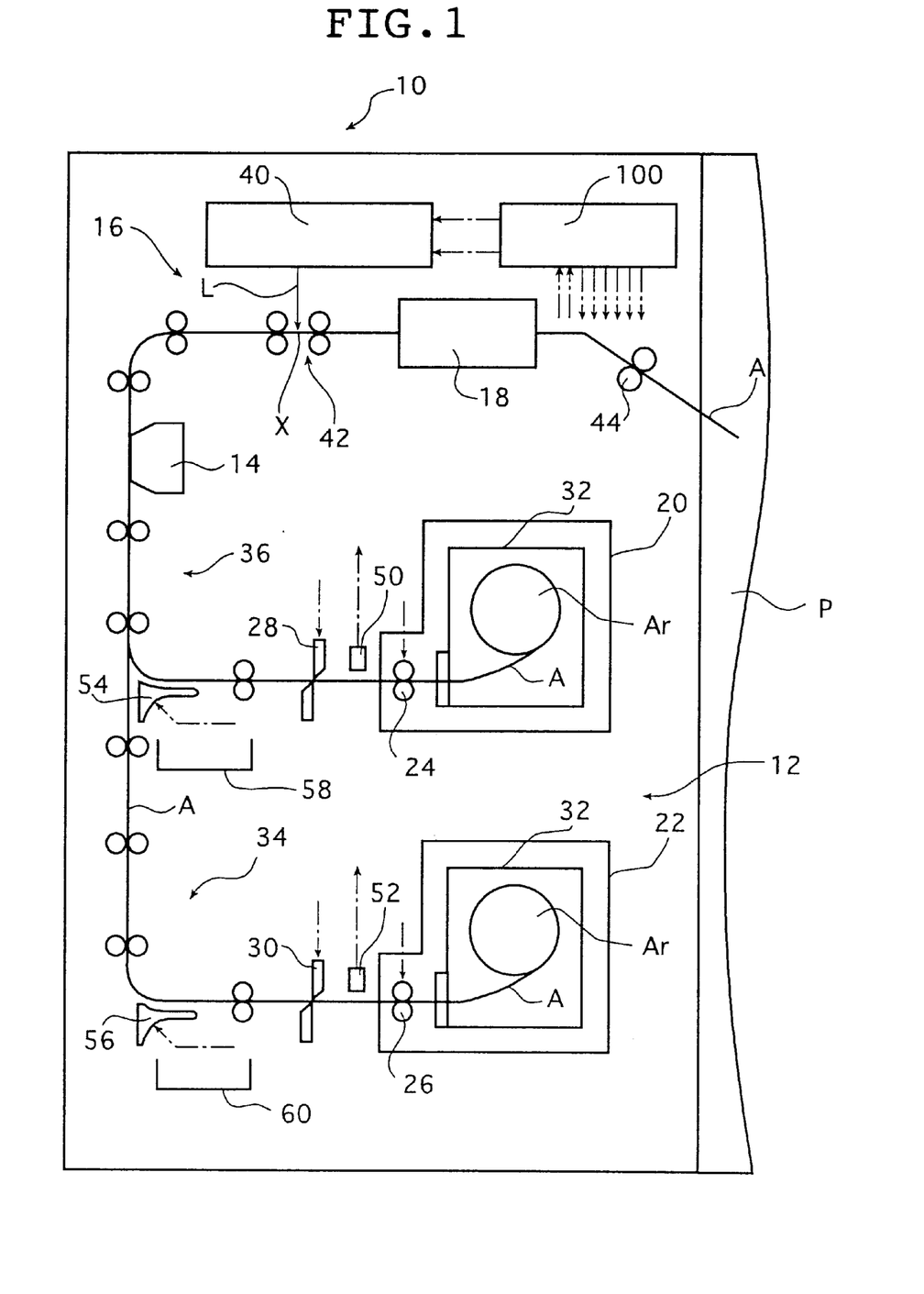
FIG. 1 is a schematic view showing an example of the image recording apparatus to which the present invention is applied.

FIG. 1 schematically shows an image recording apparatus (printer) according to the first embodiment.

A printer 10 shown in FIG. 1 is a printer included in a digital photoprinter to record a latent image on a light-sensitive material (photographic paper) A by digital exposure and output the image as a (finished) print (photograph). The elongated light-sensitive material A wound to a roll shape is cut to sheets having specified lengths in accordance with prints to be created and, after back printing (recording of a back print) and digital scan exposure, the exposed light-sensitive material A is supplied to a processor (developer) P.

The printer 10 shown in FIG. 1 comprises a light-sensitive material supply section 12, a back print means 14 for recording the back print, an image recording section 16, a distributing section 18, and a first transporting section 34 and a second transporting section 36 for transporting cut sheets of the light-sensitive material A to the image recording section 16.

In addition to the illustrated components, the printer 10 also includes as required transportation means such as transporting rollers for transporting the light-sensitive material A, a transportation guide for maintaining the direction in which the light-sensitive material A is transported at right angles to the transporting rollers, a temperature sensor and the other members.

The intervals between the transporting rollers provided as the transportation means are set smaller than the minimum possible length of the cut sheets of the light-sensitive material A.

Loading sections 20 and 22 each having a magazine 32 loaded therein are located in the light-sensitive material supply section 12 (hereinafter referred to as a supply section 12). The magazine 32 accommodates a light-sensitive material roll of lighted room loading type Ar contained in a light shielding case. The light-sensitive material roll Ar is composed of an elongated light-sensitive material A and an extreme end leader portion, the latter being composed of a non-light-sensitive material, connected to a leading end of the former and wound around the material A with an emulsion surface (light-sensitive surface) facing outside. A pull-out roller pair 24 is located in the loading section 20 and a pull-out roller pair 26 is located in the pull-out roller pair 26. Further, cutters 28 are located in correspondence to the loading section 20 and cutters 30 are located in correspondence to the loading section 22. These cutters 28, 30 are located downstream of the pull-out roller pairs 24, 26 in the vicinity thereof, respectively.

The magazines 32 loaded in the loading sections 20 and 22 usually accommodate the light-sensitive material rolls Ar which are different each other in width (size), type of paper surface (silk, matt, etc), specification (thickness, type of base, etc.) and the like.

A sensor 50 is interposed between the pull-out roller pair 24 and the cutters 28 and a sensor 52 is interposed between the pull-out roller pair 26 and the cutters 30, respectively. Various types of sensors may be used as the sensors 50, 52 for detecting the forward end of the extreme end leader portion.

Figure 2A:
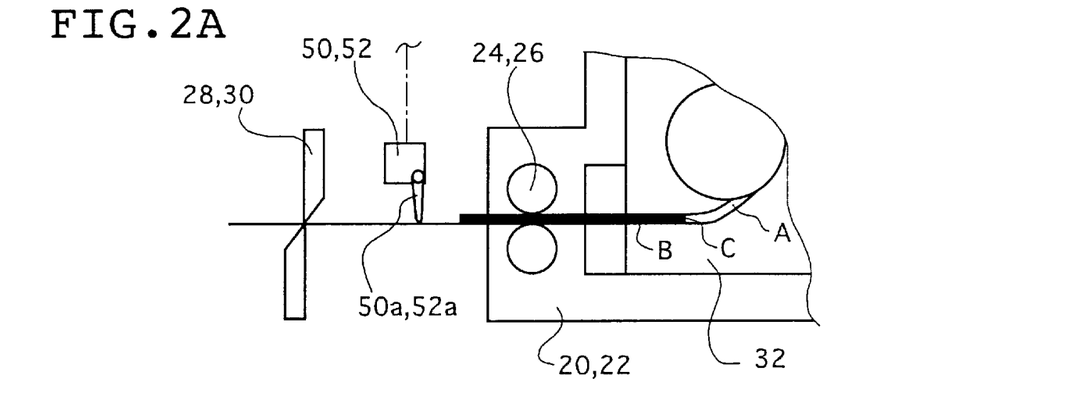
FIG. 2A, FIG. 2B and FIG. 2C are schematic views showing how the extreme end leader portion is cut in a first embodiment of the present invention, respectively.

For example, the sensors 50, 52 may be contact type sensors as shown in FIG. 2A. In this case, when a forward end B0 of an extreme end leader portion B pass just below the sensor 50 or 52, a movable arm 50a or 52a comes into contact with the forward end B0 of the extreme end leader portion B and detects the presence thereof as shown in FIG. 2B.

Figure 2B:
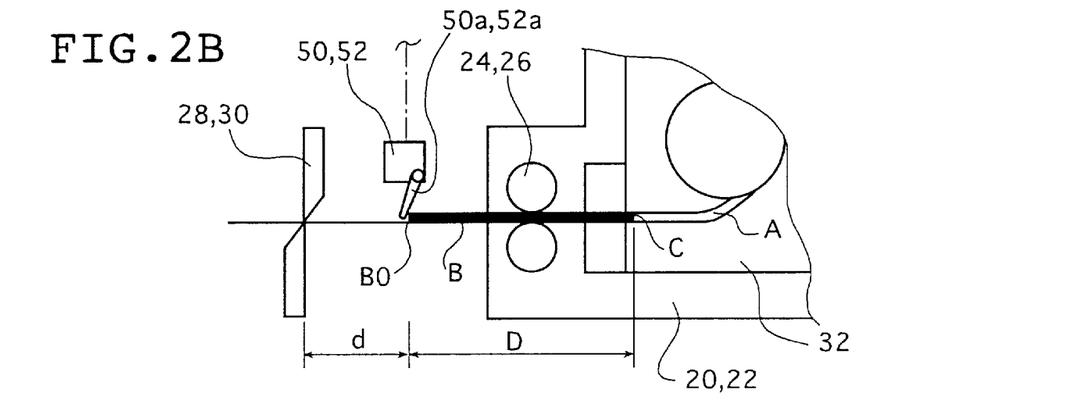
Figure 2C:
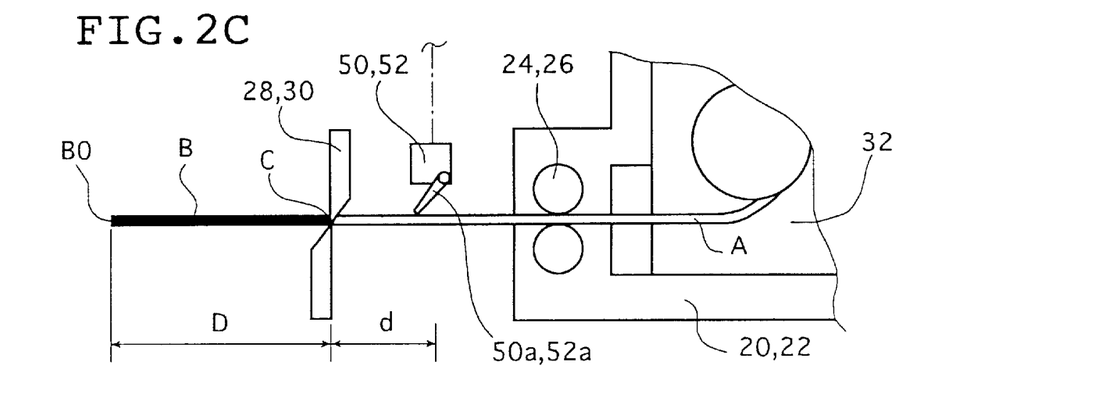

In FIGS. 2A to 2C, the boundary between the extreme end leader portion B and the light-sensitive material A is denoted by a symbol C.

Since the light-sensitive material A is wound with the emulsion surface facing outside, the surface of the light-sensitive material A with which the contact type sensor 50 or 52 comes into contact is not the emulsion surface but the back surface of the light-sensitive material as seen from FIGS. 2A to 2C. Thus, the sensors 50, 52 do not scratch the emulsion surface.

Alternatively, a light beam may be emitted from the back surface side of the light-sensitive material on a transporting passage to detect the extreme end leader portion optically at the time the forward end thereof interrupt the light beam.

Returning to FIG. 1 again, flappers 54, 56 are provided downstream of the cutters 28, 30 to eliminate the extreme end leader portions B cut by the cutters 28, 30 from the transporting passages or transport paths, respectively and stackers 58, 60 are provided downstream of the flappers 54, 56 to store the extreme end leader portions B eliminated from the transporting passages. The stackers 58, 60 can be detached from the apparatus so that the accumulated extreme end leader portions B can be appropriately discarded.

The first transporting section 34 and the second transporting section 36 comprise a plurality of transporting roller pairs. The first transporting section 34 transports the light-sensitive material A which has been pulled out of the magazine 32 of the loading section 22 by the pull-out roller pair 26 and cut to a specified size by the cutters 30 to the second transporting section 36. The second transporting section 36 is located above the first transporting section 34 and transports the light-sensitive material A which has been transported from the first transporting section 34 or the light-sensitive material A which has been pulled out of the magazine 32 of the loading section 20 by the pull-out roller pair 24 and cut to a specified size by the cutters 28 to the image recording section 16.

The back print means 14 is provided in the second transporting section 36 and used to record a so-called back print including various pieces of information such as photographed date, printed date, frame number, film ID number on the non-recording surface (emulsion free surface, that is, back surface) of the light-sensitive material A.

The image recording section 16 comprises an exposing unit 40 and a scanning/transporting means 42. The light-sensitive material A is scanned by two-dimensional exposure to the light beams L while being transported in an auxiliary scanning direction thereby recording a latent image thereon.

The exposing unit 40 is a known light beam scanning device in which three kinds of the light beams L corresponding to the exposure of the three primary colors modulated in accordance with an image to be recorded and deflected in a main scanning direction are incident on the light-sensitive material A at a specified recording position X to scan and expose the light-sensitive material A on the basis of center reference in which the center in the main scanning direction is matched with the center of the light-sensitive material A to be transported in the auxiliary scanning direction in its width direction. The exposing unit 40 comprises light sources for the respective light beams L, light beam modulating means, a light deflector such as a polygonal mirror, an fθ lens, a light passage adjusting mirror and the like.

The scanning/transporting means 42 comprises two transporting roller pairs provided on the opposite sides of the recording position X (scanning line) and an exposure guide (not shown) for suitably holding the light-sensitive material A at the recording position X. The scanning/transporting means 42 scan transports the light-sensitive material A in the auxiliary scanning direction perpendicular to the main scanning direction by the transporting roller pairs while holding the light-sensitive material A at the recording position X.

Since the light beams L are deflected in the main scanning direction as described above, the light-sensitive material A is scanned by two-dimensional exposure to the light beams L modulated in accordance with the image to be recorded and a latent image is recorded.

The distributing section 18 is provided downstream of the image recording section 16 and distributes the exposed light-sensitive materials in accordance with a sequence suitably determined by a size or the like in a direction perpendicular to the direction in which the light-sensitive materials A are transported to thereby supply the light-sensitive materials A to the processor P in a plurality of rows which are overlapped in the transporting direction.

A transporting roller pair 44 is provided downstream of the distributing section 18 to supply the light-sensitive materials A having been distributed by the distributing section 18 to the processor P.

Further, the printer 10 is provided with a control computer 100 for controlling the respective components of the printer 10. The control computer 100 particularly controls the operations of the pull-out roller pairs 24, 26, the cutters 28, 30 and the flappers 54, 56 in response to the detecting signals from the sensors 50, 52.

The operation of the first embodiment will be described below.

When the user loads the magazine accommodating the lighted-room-loading-type light-sensitive material roll Ar in the loading section 20 or 22 (without cutting the extreme end leader portion B), the pull-out roller pair 24 or 26 pulls out and transports the extreme end leader portion B.

When the forward end B0 of the extreme end leader portion B having been pulled out reaches just below the sensor 50 or 52 as shown in FIG. 2B, the forward end B0 is detected by the sensor 50 or 52.

The control computer 100 received the detecting signals of the forward end B0 from the sensor 50 or 52, and monitors the amount of transportation of the extreme end leader portion B after the forward end B0 reaches just below the sensor 50 or 52, by means of a rotary encoder (not shown) provided in the pull-out roller pair 24 or 26.

As shown in FIG. 2C, when the extreme end leader portion B is transported by the distance "D+d" wherein "D" represents the length of the extreme end leader portion B and "d" represents the distance between the cutters 28 or 30 and the sensor 50 or 52, the control computer 100 commands the cutter 28 or 30 to cut the extreme end leader portion B. When the sum "d+D" may be excessively long, the cutters 28 or 30 may cut the extreme end leader portion B to several sections each having a specified length in the course of transportation so that the extreme end leader portion B can be easily eliminated.

At this time, since the direction in which the extreme end leader portion B (and the light-sensitive materials A) are transported is kept at right angles to the transporting rollers by the transportation guide (not shown), the extreme end leader portion B can be automatically cut straight along the boundary C between the extreme end leader portion B and the light-sensitive material A so that the light-sensitive material A is not wasted.

It should be noted that it is preferable to transport the extreme end leader portion B in an amount slightly larger than the sum "D+d" because the length "D" of extreme end leader portion B is substantially set constant, but somewhat dispersed in a manufacturing process.

Figure 3A:
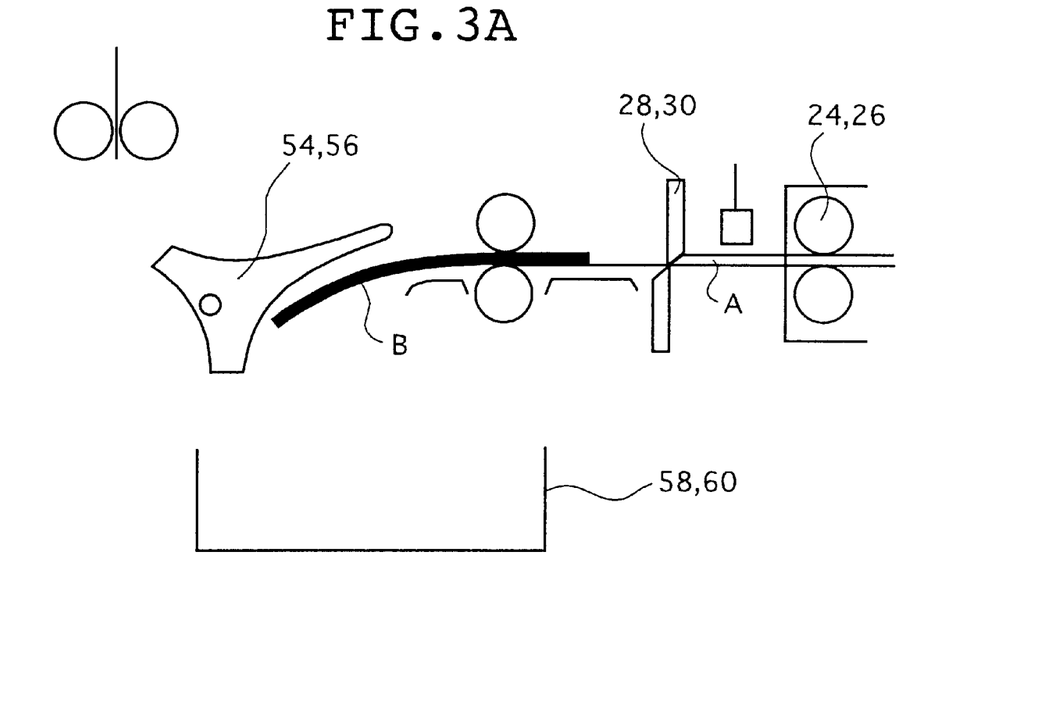
FIG. 3A and FIG. 3B are schematic views showing how the flapper operates in the first embodiment, respectively.

When the extreme end leader portion B is cut, the flapper 54 or 56 is controlled to lift its right side in response to a command from the control computer 100. As a result, the thus cut extreme end leader portion B changes its direction downward by the action of the flapper 54 or 56 as shown in FIG. 3A and gets out of an ordinary transporting passage so that it is delivered to the stacker 58 or 60 located below. The stacker 58 or 60 is detached as appropriate from the apparatus to discard the extreme end leader portions B accumulated therein.

Figure 3B:
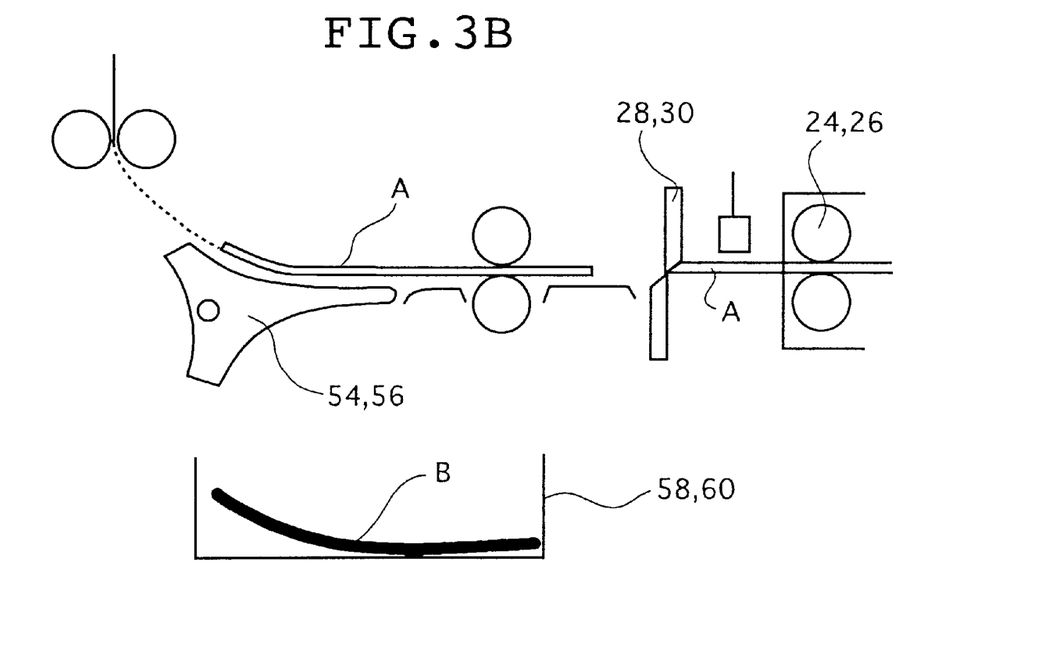

After the extreme end leader portion B is cut, the light-sensitive material A is cut to a specified length by the cutters 28 or 30 and transported. At this time, the flapper 54 or 56 is controlled to lower its right side in response to a command from the control computer 100. Therefore, the light-sensitive materials A having been cut to the specified length are transported along the ordinary transporting passage, as shown in FIG. 3B.

When the light-sensitive materials A are transported through the second transporting section 36, the back print means 14 located in the second transporting section 36 records the back print such as photographed date and the like on the non-recording surface of the light-sensitive materials A.

Thereafter, the light-sensitive materials A are transported in a right direction (in FIG. 1) to the scanning/transporting means 42 of the image recording section 16 with the recording surface thereof facing upward (so that the recording surface faces the exposing unit 40 side).

The scanning/transporting means 42 transports the light-sensitive materials A in the auxiliary transporting direction perpendicular to the main scanning direction while suitably holding the light-sensitive materials A at the recording position X.

The exposing unit 40 allows the three kinds of the light beams L corresponding to the exposure of the three primary colors modulated in accordance with an image to be recorded and deflected in the main scanning direction to be incident on the light-sensitive material A at a specified recording position X to thereby scan expose the light-sensitive material A.

The thus exposed light-sensitive materials A are distributed by the distributing section 18, supplied to the processor P by the transporting roller pair 44 located downstream, subjected to development processing such as color development, bleaching/fixing, rinsing and the like, dried and delivered outside as (finished) prints.

Next, a second embodiment of the present invention will be described.

In the second embodiment, the extreme end leader portion B is not separated from the light-sensitive material A along the boundary C therebetween as described in the above first embodiment, but is finely cut to strips to facilitate the disposal thereof.

According to the second embodiment, a flapper and stacker for eliminating the extreme end leader portion B having been cut to a single sheet from the transporting passage need not be provided and are replaced by trash boxes provided downstream of cutters to receive the wastes of the finely cut extreme end leader portion B. Alternatively, a method in which finely cut wastes are directly discharged outside the apparatus and directly collected by a trash bag or the like located outside the discharge port of the apparatus may be used depending upon the structure of the apparatus, so that the apparatus does not require trash boxes.

Figure 4A:
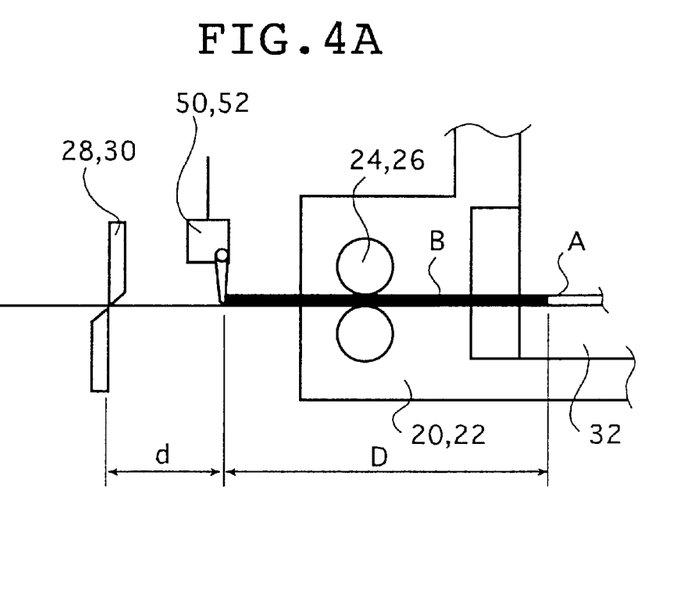
FIG. 4A and FIG. 4B are schematic views showing how the extreme end leader portion is cut in a second embodiment of the present invention, respectively.
Figure 4B:
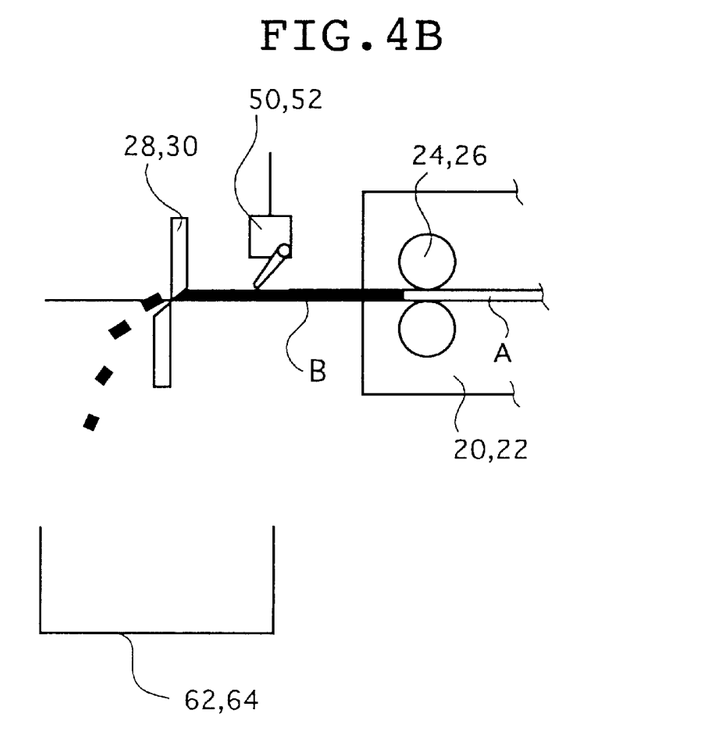

FIG. 4 schematically shows the site where the extreme end leader portion B is cut to strips in the second embodiment.

In FIG. 4, pull-out roller pairs 24, 26, cutters 28, 30 and sensors 50, 52 are arranged similarly to those of the first embodiment. In the embodiment shown in FIG. 4, trash boxes 62, 64 are provided downstream of the cutters 28, 30.

As shown in FIG. 4A, when the extreme end leader portions B are transported by the distance "d" between the sensors 50, 52 and the cutters 28, 30 after the forward ends B0 of the extreme end leader portions B reach just below the sensors 50, 52 and are detected by the sensors 50, 52, the forward ends B0 reach the cutters 28, 30.

Then, the extreme end leader portions B are cut to strips at specified intervals from the position where the forward ends B0 reach the cutters 28, 30 as shown in FIG. 4B. The extreme end leader portions B are continuously cut to strips until they are transported by the length "D" after the start of the cutting operation. With this operation, the extreme end leader portions B are finely cut. The finely cut strips are received by the trash boxes 62, 64 provided below the cutters 28, 30. The trash boxes 62, 64 which can be detached from the apparatus are taken out thereof when necessary to discard cut wastes.

Thereafter, the light-sensitive material A is cut to a specified length, transported and subjected to ordinary processing.

Since the second embodiment does not require the flappers 54, 56 for eliminating the cut extreme end leader portions B from the transporting passage nor control thereof as in the first embodiment, the apparatus can be simply configured and the disposal of the wastes can be facilitated, although it takes a little longer time to cut the extreme end leader portion B to strips.

In third and fourth embodiments which will be described below, sensors 50, 52 do not detect the forward ends B0 of the extreme end leader portions B as in the above first and second embodiments, but detect the boundaries between the extreme end leader portions B and the light-sensitive materials A. As to the method of cutting the extreme end leader portion B, the third embodiment corresponds to the first embodiment and the fourth embodiment corresponds to the second embodiment, respectively.

Next, the third embodiment will be described.

Figure 5:
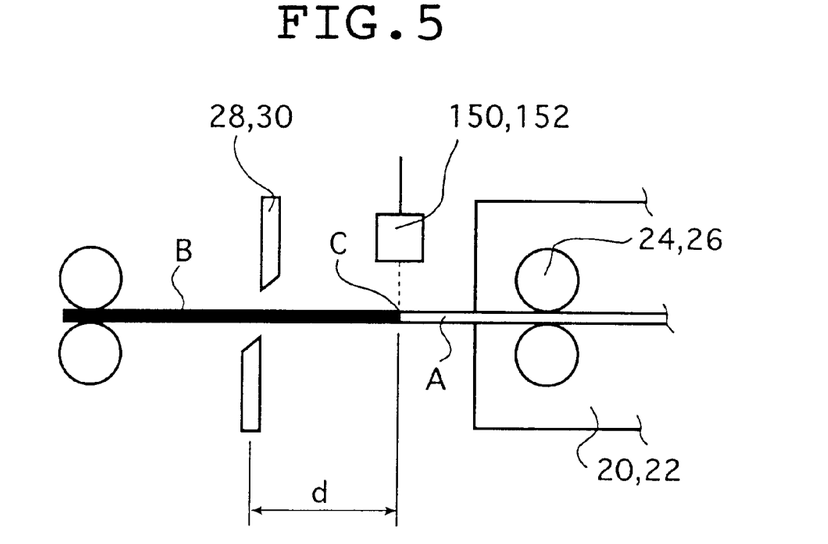
FIG. 5 is a schematic view showing how the extreme end leader portion is cut in a third embodiment of the present invention.

FIG. 5 schematically shows a site relating to the cutting of the extreme end leader portion in the third embodiment. In FIG. 5, pull-out roller pairs 24, 26 and cutters 28, 30 are arranged similarly to those of the first and second embodiments. Sensors 150, 152 interposed between the pull-out roller pairs 24, 26 and the cutters 28, 30 detect the boundary C between the extreme end leader portion B and the light-sensitive material A.

Various types of sensors are also applicable as the sensors 150, 152. For example, since the back surface of the extreme end leader portion B is black and the back surface of the light-sensitive material A is a reflecting surface or white, a reflecting type sensor or the like which detects the boundary C by a difference of intensities of there reflected lights, that is, based on a difference in reflectances of the back surfaces of the extreme end portion and the light-sensitive material may be employed.

Alternatively, the tape connecting the extreme end leader portion B and the light-sensitive material in the boundary there between A may be detected based on a difference in reflectances of the extreme end leader portion and the tape, or a little more thick connecting tape may be used to detect the boundary by a contact type sensor as in the first embodiment based on a step between the extreme end portion and the little more thick tape.

The extreme end leader portions B can be separated from the light-sensitive materials A just along the boundaries C by the method as shown in FIG. 5 in which the extreme end leader portions B transported by the distance "d" between the sensors 150, 152 and the cutters 28, 30 after the sensors 150, 152 detect the boundaries C are cut by the cutters 28, 30.

The method of eliminating the thus cut extreme end leader portion B from the transporting passage and the subsequent processing to be performed on the light-sensitive material A are similar to those of the first embodiment.

Since the boundary can be correctly detected in the third embodiment as described above, the extreme end leader portion B can be automatically separated from the light-sensitive material A just along the boundary C even if the length (D) of the extreme end leader portion B is dispersed. When the length "D" of the extreme end leader portion B is long, the extreme end leader portion B being transported may be cut repeatedly in specified intervals until the boundary C is detected, so that the extreme end leader portion B can be easily eliminated.

Next, the fourth embodiment will be described.

In the fourth embodiment, the extreme end leader portion B is finely cut to strips as in the second embodiment.

Figure 6:
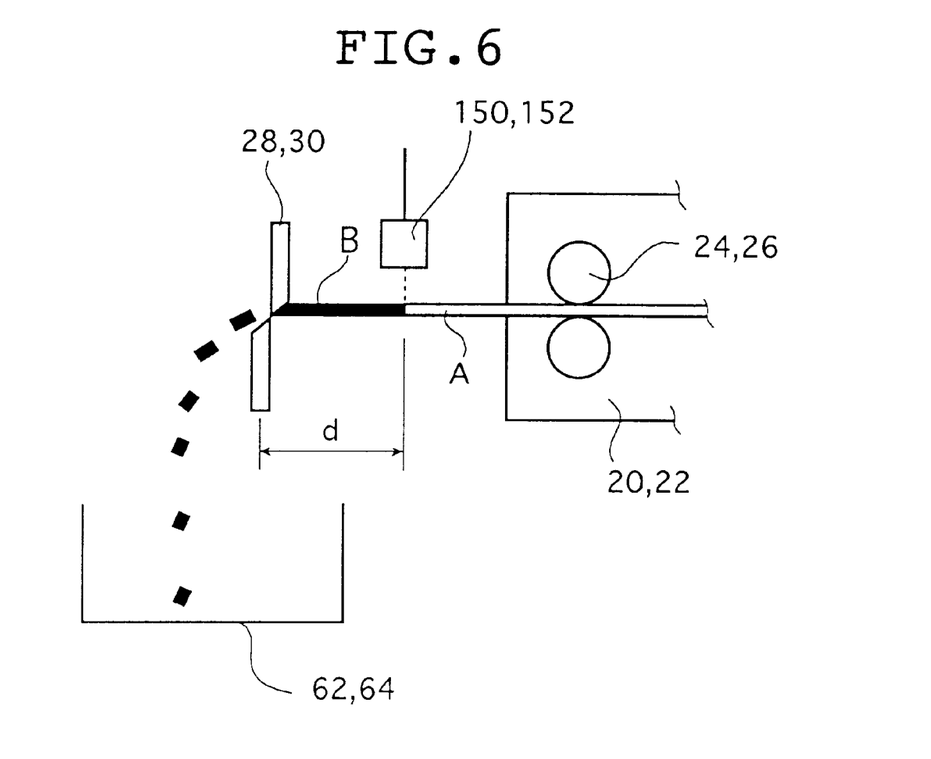
FIG. 6 is a schematic view showing how the extreme end leader portion is cut in a fourth embodiment of the present invention.

Although the apparatus of the fourth embodiment is arranged similarly to that of the third embodiment shown in FIG. 5, the former is not provided with a flapper nor stacker as in the second embodiment, but with trash boxes 62, 64 that are located below cutters 28, 30 as shown in FIG. 6.

In FIG. 6, the cutters 28, 30 cut the extreme end leader portions B to strips at specified intervals from the forward ends thereof. The cutters 28, 30 continuously cut the extreme end leader portions B after the boundaries C are detected by the sensors 150, 152 until the extreme end leader portions B are transported by the distance "d" between the sensors 150, 152 and the cutters 28, 30.

As a result, only the extreme end leader portion B can be finely cut to stripes. Thus, according to the fourth embodiment, the extreme end leader portion B can be automatically and correctly cut regardless of the dispersion of the length thereof and the disposal of the wastes can be facilitated.

Although the image recording apparatus of the present invention has been described above in detail, the extreme end leader portion can be automatically and accurately cut along the boundary between the extreme end leader portion and the light-sensitive material in any of the above embodiments, whereby the wastes of the light-sensitive material can be prevented.

Further, the present invention is by no means limited to the above embodiments and it goes without saying that various improvements and modifications can be made within the range which does not depart from the scope and spirit of the invention.

Figure 7:
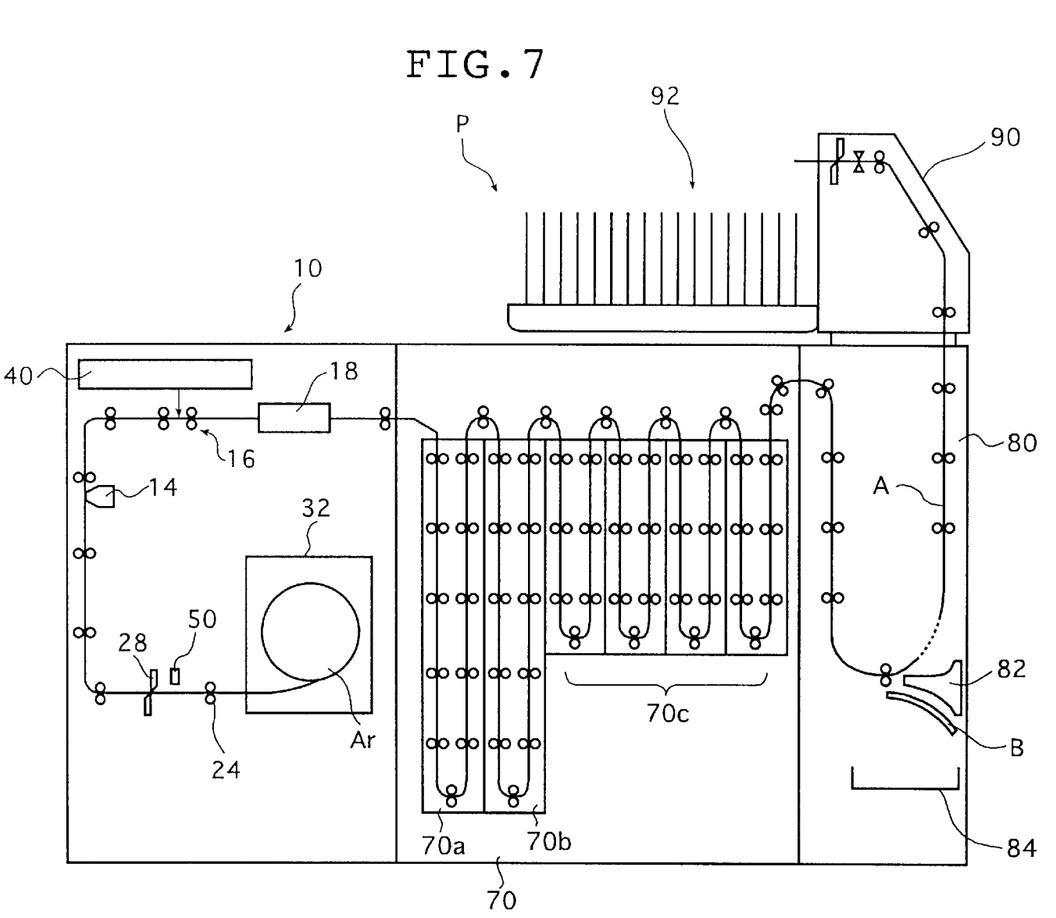
FIG. 7 is a schematic view showing how the extreme end leader portion is delivered outside through the processor.

For example, in the first or third embodiment, the extreme end leader portion B having been cut may not be eliminated in the course of the transporting passage, but after passing through the ordinary transporting passage including the printer, processor and the like. In the illustrated case shown in FIG. 7, the extreme end leader portion B having been cut is transported through the ordinary transporting passage of the printer 10 via the back print means 14, the image recording section 16 and the distributing section 18, and then supplied into the processor P. Thereafter, the extreme end leader portion B supplied into the processor P is delivered through the ordinary transporting passage, that is, through a developing section 70 including a color developing bath 70a, a bleach-fixing bath 70b and a rinsing bath 70c to a drying section 80, and accumulated in a stacker 84 provided below, while the transport direction being turned upward by a flapper 82 provided therein. It should be noted that FIG. 7 shows only one magazine for the sake of simplicity.

The light-sensitive material A is transported from the drying section 80 into a cutting section 90 and cut to sheets having a specified length as finished prints to be delivered into a sorter 92. The flappers 82 and the stackers 84 may not be provided. In this case, one section of the sorter 92 can be used as a means of receiving the extreme end leader portion B transported to the last cutting section 90 in a frame thereof. This arrangement does not require any trash boxes in the transporting passage.

As described above, according to the present invention, the extreme end leader portion can be automatically and accurately cut straight along the boundary between the extreme end leader portion and the light-sensitive material, whereby the wastes of the light-sensitive material can be prevented.

What is claimed is:

1. An image recording apparatus comprising:
   at least one loading section which loads a light-sensitive material magazine accommodating a light-sensitive material roll of a lighted room loading type, said light-sensitive material roll including an elongated light-sensitive material wound into a roll shape and an extreme end leader portion composed of a non-light-sensitive material which is connected to a leading end of the light sensitive material;

at least one pull-out roller pair which pulls the light-sensitive material out of said light-sensitive material magazine;

at least one cutting means which cuts the light-sensitive material which was pulled out by said pull-out roller pair;

at least one sensor detects said extreme end leader portion or the light-sensitive material;

means for controlling said pull-out roller pair and said cutting means in accordance with a detecting signal from the sensor so that said extreme end leader portion is automatically cut along a boundary with said light-sensitive material while transporting said extreme end leader portion and the light-sensitive material by said pull-out roller pair when the light-sensitive material magazine accommodating a virgin light-sensitive material roll is loaded; and an image recording section to record a latent image on the light-sensitive material.

2. The image recording apparatus according to claim 1, further comprising:

a processor having a developing section to develop the light-sensitive material on which the latent image was recorded.

3. The image recording apparatus according to claim 1, wherein said sensor detects a forward end of said extreme end leader portion.

4. The image recording apparatus according to claim 3, wherein said sensor is a contact type sensor having a movable arm to detect that said arm came into contact with said forward end of said extreme end leader portion, or an optical sensor to detect that said forward end of said extreme end leader portion passed through a light beam emitted by the optical sensor.

5. The image recording apparatus according to claim 3, wherein said cutting means cuts said extreme end leader portion which is transported by the pull-out roller pair by a specified distance after said forward end was detected by the sensor.

6. The image recording apparatus according to claim 3, wherein said cutting means cuts said extreme end leader portion to strips at specified intervals until said extreme end leader portion is transported by a specified distance by the pull-out roller pair after said forward end was detected by the sensor.

7. The image recording apparatus according to claim 1, wherein said sensor detects the boundary between said extreme end leader portion and the light-sensitive material by optical or mechanical recognition.

8. The image recording apparatus according to claim 7, wherein said sensor is a contact type sensor having the movable arm to detect the boundary formed by a tape connecting said extreme end leader portion and the light-sensitive material based on a step between the extreme end leader portion and the tape when said movable arm came into contact with said boundary, or an optical sensor which emits the light beam on back surfaces of the extreme end leader portion and the light-sensitive material to detect the boundary therebetween based on a difference in reflectances of the back surfaces.

9. The image recording apparatus according to claim 7, wherein said cutting means cuts said extreme end leader portion which is transported a specified distance by the pull-out roller pair after said boundary was detected by the sensor.

10. The image recording apparatus according to claim 7, wherein said cutting means cuts said extreme end leader portion into strips at specified intervals until said extreme end leader portion is transported by a specified distance by the pull-out roller pair after said boundary was detected by the sensor.

11. The image recording apparatus according to claim 1, further comprising means for removing the extreme end leader portion which was cut by said cutting means in a transport path through which the light-sensitive material is transported.

12. The image recording apparatus according to claim 11, wherein said removing means comprises a flapper which provided in the transport path through which said light-sensitive material is transported and which changes a transport direction for the cut extreme end leader portion, and a stacker provided under the flapper to receive the cut extreme end leader portion.

13. The image recording apparatus according to claim 2, further comprising means for removing the extreme end leader portion which was cut by said cutting means after having transported through an ordinary transport path including the developing section of the processor through which the light-sensitive material is transported.

14. The image recording apparatus according to claim 13, wherein said removing means comprises a flapper which provided in said ordinary transport path through which said light-sensitive material is transported and downstream of the developing section in the processor, and which changes a transport direction for the cut extreme end leader portion, and a stacker provided under the flapper to receive the cut extreme end leader portion.

15. The image recording apparatus according to claim 2, wherein said processor further comprises a sorter having a plurality of sorting sections for sorting finished prints, and wherein said extreme end leader portion which was cut by said cutting means is transported through an ordinary transport path through which the light-sensitive material is transported and is received into one section of said sorter.

* * * * *